United States Patent
Bennett et al.

[11] Patent Number: 5,784,427
[45] Date of Patent: Jul. 21, 1998

[54] FEEDBACK AND SHIFT UNIT

[75] Inventors: Irwin Bennett; Andrew Page; Barry King; Paul Golding, all of Swindon, United Kingdom

[73] Assignee: Motorola, Inc., Schaumburg, Ill.

[21] Appl. No.: 672,010

[22] Filed: Jun. 24, 1996

[51] Int. Cl.$^6$ .................................................. G11C 19/00
[52] U.S. Cl. ................................................ 377/72; 377/81
[58] Field of Search ........................................ 377/72, 81

[56] References Cited

U.S. PATENT DOCUMENTS

| | | | |
|---|---|---|---|
| 4,747,105 | 5/1988 | Wilson et al. | 371/47 |
| 5,073,909 | 12/1991 | Kotzin et al. | 377/72 |
| 5,243,622 | 9/1993 | Lux et al. | 375/1 |
| 5,412,665 | 5/1995 | Gruodis et al. | 371/27 |

FOREIGN PATENT DOCUMENTS

88/04097  2/1988  WIPO .

*Primary Examiner*—Margaret Rose Wambach
*Attorney, Agent, or Firm*—Heather L. Creps

[57] ABSTRACT

A feedback and shift unit is arranged to reduce to a minimum the number of processing steps required in a processor, such as a DSP, to achieve a particular operating function, such as a linear feedback shift or a stepping function used by encryption algorithms. The feedback and shift unit (50) comprises a linear feedback shift register (52) for storing a value of the feedback and shift unit. A tap register (56) stores a tap position indicator indicative of tap positions for the feedback and shift unit (50). An input provides data to the feedback and shift unit. A feedback matrix, coupled to receive the data from the input, provides data bits, generated in response to the data and the tap position indicator, that are shifted into the linear feedback shift register (52) to form the value stored therein.

9 Claims, 5 Drawing Sheets

FEEDBACK AND SHIFT UNIT

BACKGROUND OF THE INVENTION

This invention relates, in general, to feedback and shift units and is particularly, but not exclusively, applicable to linear feedback shift registers utilised with digital signal processors (DSPs).

SUMMARY OF THE PRIOR ART

Infrastructure of modern communications systems, such as the pan-European GSM (Groupe Speciale Mobile) cellular communications system, is required to undertake and successfully execute a multitude of complex tasks. For example, the infrastructure is required to administer such tasks as communication hand-off between discrete cells of the communication system, and also the encryption or decryption of information (either voice or data) that is transmitted over a communication resource of the system.

In general, the number of components in a base station, for example, required to realise a particular function offered by that base station is related to the intensity of the tasks performed to execute that function, and the processing capability of the components on which the function is performed. However, as a consequence of the ever-increasing competition in the market-place for communications systems, manufacturers in general have found it necessary to produce low cost, reliable equipment that can cope with the ever increasing demands of system operation and functionality. In this respect, manufacturers have attempted to reduce to a minimum the number of components, such as DSPs, and to optimise the use of these components.

Clearly, increasing the speed of operation of components results in an increase in the processing (handling) capacity of each component and hence an increased throughput, which increased throughput may permit elimination of some components. Also, in combination with the development of faster components, manufacturers have reduced component count by developing dedicated, integrated circuits that perform specific functions as efficiently as possible. However, in this latter case, manufacturers have experienced that such development is both costly in time and money and can often lead to a structural solution that is inflexible and therefore difficult to adapt to future needs. As such, development of dedicated integrated circuits is only really acceptable when the requirements of the system are known, understood or stable. Furthermore, although the increase in processing power ultimately provides a cheaper and more flexible solution, current technologies (such as DSP technology) have placed an upper limit on component (device) speed that is insufficient to meet the present-day requirements and aspirations of manufacturers.

One particular function that requires extensive processing power, i.e. the extensive use of DSPs, arises from the ciphering requirement of inter alia the aforementioned GSM communication system. Indeed, this ciphering requirement accounts for approximately 40% of the processing load associated with a full-rate speech call. Furthermore, in the specific case of the GSM communication system, there is a likelihood that the two presently utilised cipher-algorithms will be extended by a further five alternate cipher-algorithms. Since these additional cipher-algorithms are yet to be fully defined, the potential inflexibility imposed by the use of dedicated integrated circuits on future adaptations of existing infrastructure, for example, deters the use of such dedicated circuits.

Current GSM cipher-algorithms make extensive use of linear feedback shift registers (LFSRs). Indeed, to implement one cycle of a linear feedback shift register requires, typically, five distinct DSP instructions, which manipulation in the shift register accounts for the high processing overhead. Furthermore, the GSM cipher-algorithms make extensive use of a stepping function that controls the shifting of a number of such linear feedback shift registers. This additional manipulation accounts for approximately 30% of the processing overhead of the cipher-algorithm. Additionally, time critical GSM encryption algorithms make extensive use of a function that determines whether there is a majority of logical "1s" or logical "0s" in certain bit positions of a linear feedback shift register. More specifically, in the A-5-2 encryption algorithm this majority function (which is performed on 3 bits only) typically requires 10 instructions to be issued to the digital signal processor and counts for approximately 30% of the processing requirement of the algorithm.

As such, there is a requirement to provide a method of increasing the efficiency of a DSP in performing ciphering, for example, in such a way that the number of calls that can be handled by the DSP is increased while, at the same time, ensuring that there is sufficient flexibility in the DSP structure or architecture to allow the DSP to be modified to accommodate new cipher-algorithms and therefore to extend the life of equipment, e.g. infrastructure.

SUMMARY OF THE INVENTION

According to the present invention there is provided a feedback and shift unit comprising: linear feedback shift register means for storing a value of the feedback and shift unit; tap register means for storing a tap position indicator indicative of tap positions for the feedback and shift unit; an input for providing data to the feedback and shift unit; and feedback matrix means, coupled to receive the data from the input, for providing data bits, generated in response to the data and the tap position indicator, that are shifted into the linear feedback shift register means to form the value stored therein.

In a preferred embodiment, the feedback and shift unit further comprises: length register means for storing a length indicator, the length register means being logically coupled to the linear feedback shift register means whereby the length indicator sets a length of the length register means corresponding to a length of the feedback and shift unit.

In a second aspect of the present invention there is provided a feedback and shift device for providing a stepping function, said feedback and shift device comprising: a first feedback and shift unit according to the first aspect of the present invention; a second feedback and shift unit according to the first aspect of the present invention; a first mask register, logically coupled to the first feedback and shift unit, for identifying and selectively passing only certain bits of the first linear feedback shift register means to provide a first output; a second mask register, logically coupled to the second feedback and shift unit, for identifying and selectively passing only certain bits of the second linear feedback shift register means to provide a second output; and control means coupled to receive the first output and the second output and arranged to selectively step the first and second linear feedback shift register means in response thereto.

In another aspect of the present invention there is provided a feedback and shift device for providing a majority function, said feedback and shift device comprising: a feedback and shift unit according to the first aspect of the present invention; a mask register for identifying and selecting particular bits of the LFSR means that are subject to a logical operation; a logic network coupled to receive the bits selected by the mask register and arranged to perform the logical operation thereon to provide a first output data word having a plurality of data bits; and a second tap register arranged to identify and selectively pass only certain bits of the plurality of data bits of the first output data word; and majority determining means for determining a logical majority in response to the certain bits passed by the second tap register.

Exemplary embodiments of the present invention will now be described with reference to the accompanying drawings.

DETAILED DESCRIPTION OF A PREFERRED EMBODIMENT

Figure 1:
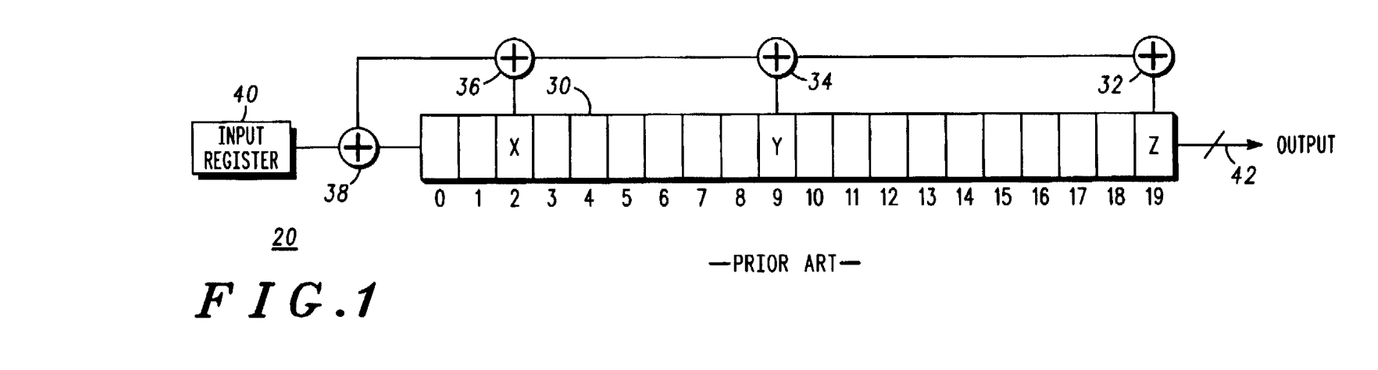
FIG. 1 is a representation of a typical prior art linear feedback shift register (LFSR) function.

Referring to FIG. 1, a functional diagram of a prior art Linear Feedback Shift Register (LFSR), generally depicted 20, is illustrated. The LFSR function 20 is achieved through the use of a shift register 30 containing a plurality (in this case twenty) storage elements for storing data bits. Additionally, the LFSR function 20 requires tapping into one or more data bits within the shift register 30. In the case of FIG. 1, bits 2, 9 and 19 are tapped, which bits contain information bits x, y and z, respectively. After tapping, bit 19 containing data Z, is exclusively-ORed (XORed) in logic gate 32. The result from logic gate 32 is exclusively-ORed in logic gate 34 with data y from data bit 9. Similarly, the output from logic gate 34 is XORed with data x (from data bit 2) in logic gate 36. The output from logic gate 36 is XORed in logic gate 38 with a least significant bit of an input sequence of data. An output from logic gate 38 is coupled to the most significant bit of register 30.

The input sequence of data to logic gate 38 is injected (clocked) into the shift register 30 from, typically, an input register 40. During successive clock periods, data in the shift register 30 is clocked from its most significant bit to its least significant bit, with each new piece of data entering the register 30 determined by the XOR logic functions of logic gates 32, 34, 36 and 38, in combination with the least significant data bit from the input register 40. The shift register 30 provides an output code from output 42, which output code may be used in an encryption algorithm. The output code may be in the form of a parallel output of data (information), but this need not be the case.

Figure 2:
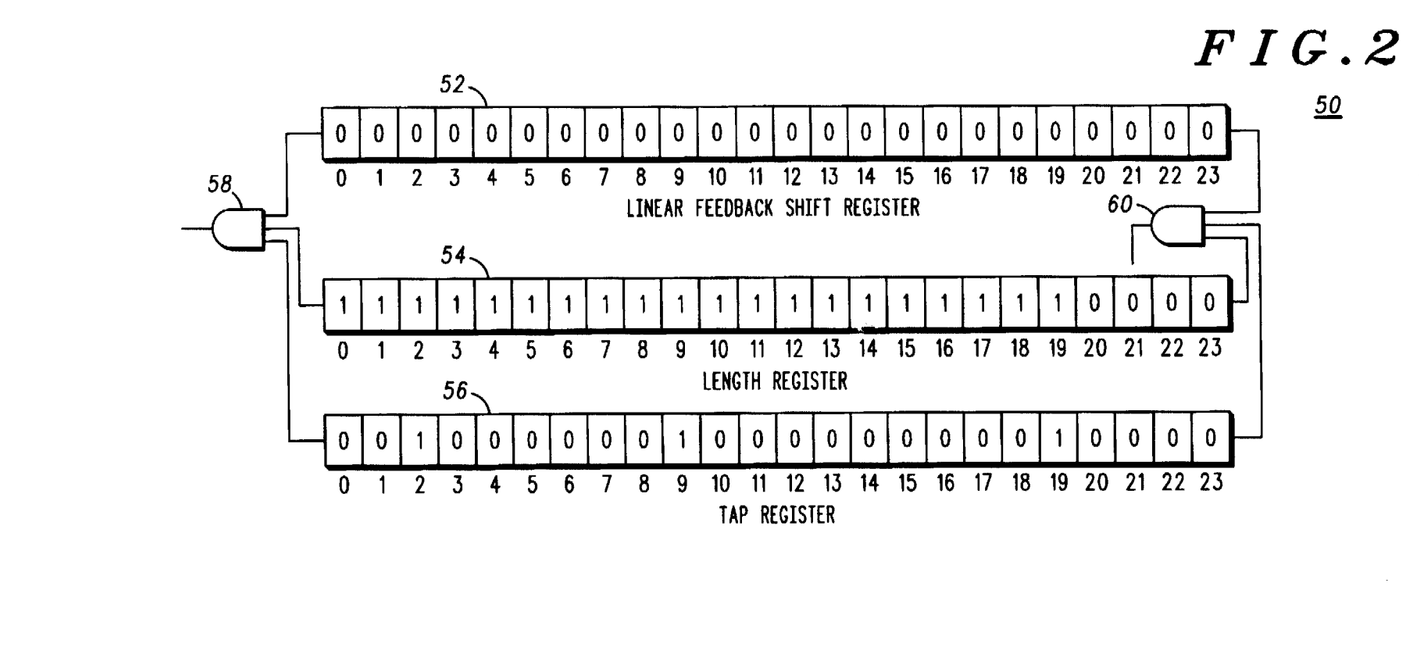
FIG. 2 is register configuration representing a hardware equivalent of a LFSR according to a preferred embodiment of the present invention.

Referring now to FIG. 2, there is shown a structure which provides a linear feedback shift function according to a first aspect of the present invention. The structure (generally depicted by the reference 50) comprises three discrete registers. A first shift register stores the individual bits of an output code. In this respect, the first shift register 52 is equivalent to the register 30 of FIG. 1. A second register (known as a length register) 54 is used to define the length of the code word used as the output code. In this case, consecutive bits in the length register are set to logical "1" to identify the length of the output code. Referring to the figure, it can be seen that bits 0 to 19 are set to logical "1" indicating that the code word has a length of twenty bits. A third register (known as a tap register) 56 contains a number of logical "1s" at salient (storage elements) positions in the tap register 56 to identify the particular bits in the first register 52 that are to be tapped, and hence which bits are subjected to the XOR function (indicated by logical blocks 32-38 of FIG. 1). As can be seen, the tap register 56 has logical "1s" at bits 2, 9 and 19, indicating that these bits require tapping.

Although in the present case the first register 52 contains 24 bits, it will be appreciated that the length of the register is dependant upon the particular length of data words used by the encryption algorithms. Therefore, the length register performs the task of setting the length of the output code, and may be eliminated when the shift register 30 is specifically designed to store the requisite output code. Alternatively, the length register may be eliminated since the length can be determined by the highest tap value.

To determine whether a particular bit is subject to the XOR function of the encryption algorithm, a simple logic block (an AND logic gate) is coupled to receive each corresponding bit of the first shift register 52, the length register 54 and the tap register 56. For the sake of illustration, FIG. 2 shows only two such AND gates, labelled 58 and 60. As would be appreciated by a person of ordinary skill in the art, a complimentary system of using logical "0s" could be adopted provided that the necessary logic was implemented to identify the bits that were subject to the XOR function.

Figure 3:
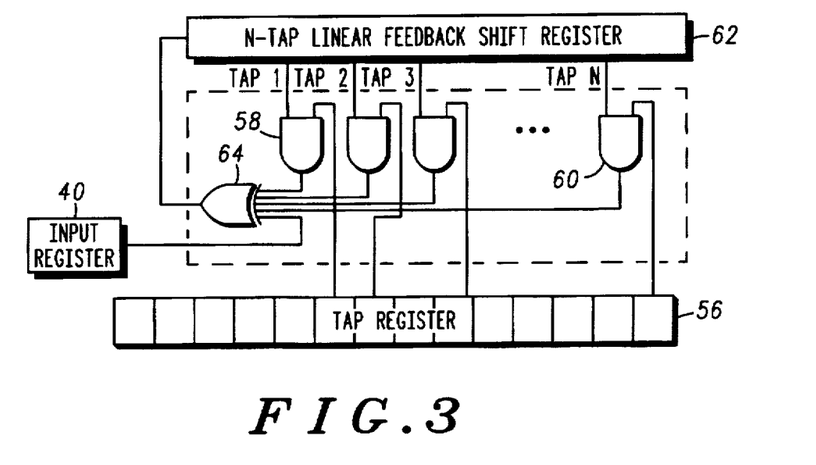
FIG. 3 is a more detailed representation of the LFSR of FIG. 2.

FIG. 3 illustrates, in a more detailed nature, a block arrangement of the LFSR of the first aspect of the present invention. In this instance, outputs from particular bits of an N-Tap LFSR 62 (achieved by the logical ANDing of respective bits of the first shift register 52 and the length register 54) are masked by respective bits of tap register 56 in logical AND gates (such as 58 and 60). Outputs from AND gates 58 and 60 are coupled to XOR feedback matrix 64, from which an output is fed back to the first shift register 52 (not shown).

As such, a single DSP step may now accomplish (execute) a LFSR cycle. Therefore, rather than the five DSP instructions previously required to implement one cycle of a LFSR (accounting for approximately 40% of the processing requirement of the cipher-algorithm), the present invention reduces manipulation of registers by 80%, while reducing overhead associated with the cipher-algorithm, as a whole, by approximately 30%.

Figure 4:
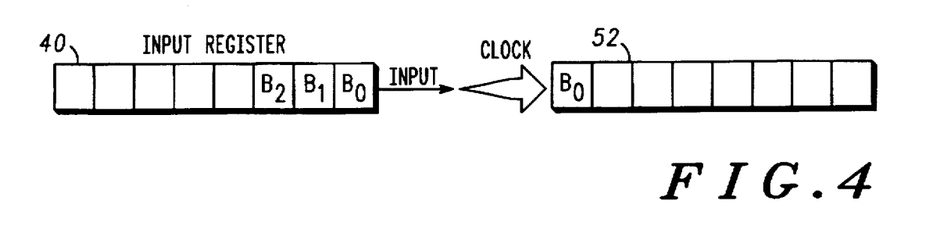
FIG. 4 illustrates how input data might be clocked into the LFSR of the preferred embodiment of FIG. 2.
Figure 5:
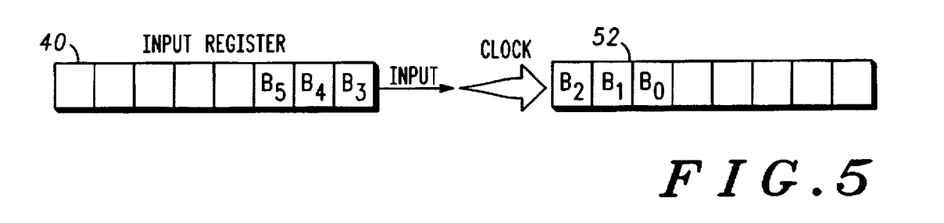
FIG. 5 illustrates an alternative way in which input data may be progressed through the LFSR of the preferred embodiment of FIG. 2
Figure 6:
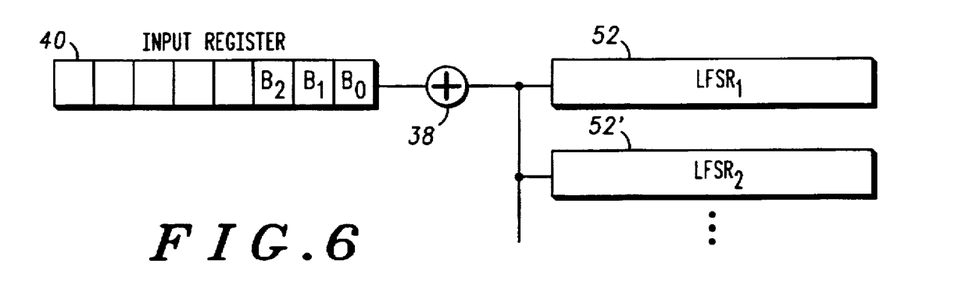
FIG. 6 illustrates a further alternative of how data might be input into a plurality of LFSRs constructed in accordance with the preferred embodiment of FIG. 2.

In the present invention, it is contemplated that the least significant bits of the input register 40 may be clocked into the first shift register 52 in a number of different ways, illustrated in FIGS. 4 to 6. In FIG. 4, data in the input register 40 is up-dated each clock cycle (i.e. the data word contained in the input registered is over-written every clock cycle) so that a succession of least significant bits are clocked into the first shift register 52. Alternatively, FIG. 5 illustrates that data in the input register 30 is successively shifted into the first shift register 52, whereby the most significant bit of the input register 30 is shifted each clock cycle. Moreover, the formats of data input shown in FIGS. 4 and 5 may be extended to structural arrangements in which a plurality of shift registers 52, 52' are coupled to receive data emanating from the input register 30. More particularly, FIG. 6 shows that XOR date 38 (of FIG. 1) is coupled to the most significant bits of shift registers 52 and 52', such that the result of the XOR operation is simultaneously provided as an input to several shift registers (52 and 52').

Figure 7:
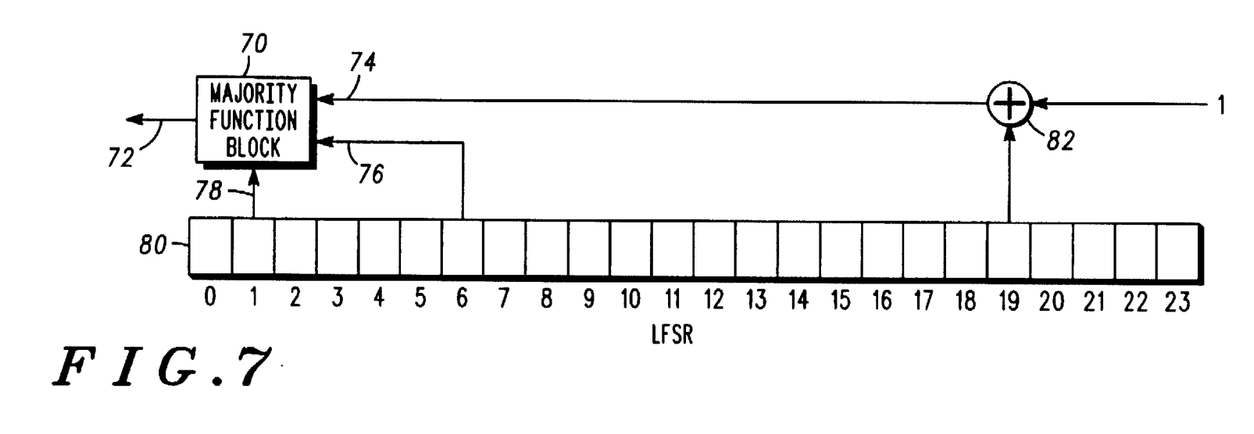
FIG. 7 is a functional block diagram illustrating a majority function of a type used in some encryption algorithms.

Referring to FIG. 7, a functional diagram illustrates the operation of a bit-wise majority function operation. As will be appreciated, majority function block 70 provides an output 72 dependent upon which type of logical input occurs most frequently during a particular clock period. Logical data provided to inputs 76, 76 and 78 is obtained (via taps) from particular bits of a shift register 80. (As will be appreciated, shift register 80 may be the linear feedback shift register 30 of FIG. 1). In the particular case of FIG. 7, bits 1, 6 and 19 are tapped, with bit 19 being XORed with a pre-set logic "1" value in XOR-gate 82 prior to being input into the majority function block 70. As will be appreciated, the effect of the XOR function is to invert the logical value.

Figure 8:
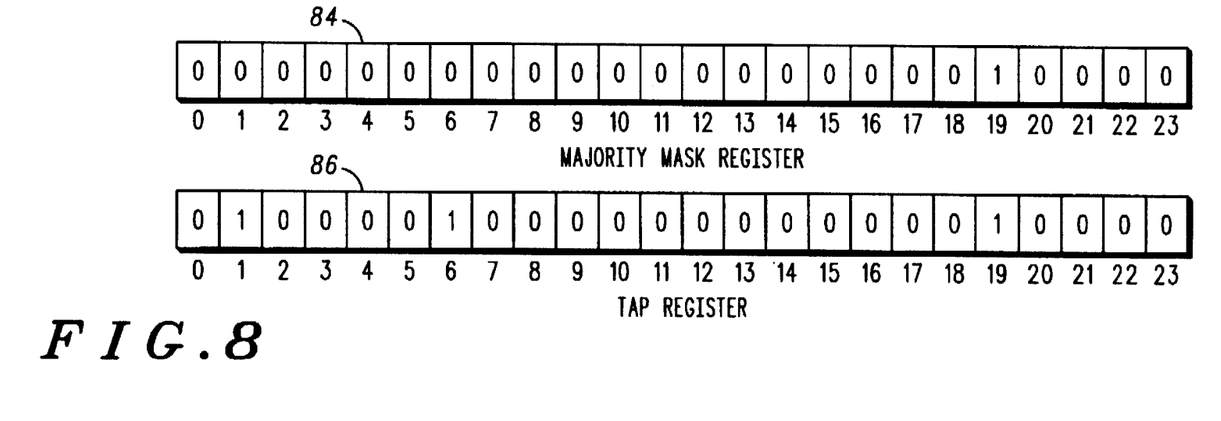
FIG. 8 shows a preferred hardware register configuration for implementing the majority function of a type used in some encryption algorithms shown in FIG. 7, according to a second aspect of the present invention.

In a second aspect of the present invention, the register structure of FIG. 8 provides an equivalent majority function. More specifically, a shift register (such as shift register 80 or the first shift register 52 of FIG. 2) is selectively masked by two dedicated registers: a majority mask register 84 and a tap register 86. Tap register 86 and majority mask register 84 are arranged such that particular storage elements thereof contain logic values (e.g. logical "1"s) that identify, respectively, tap positions in the shift register and tap positions which are to be XORed (through a logic network analogous to XOR gate 82) prior to majority determination. In the specific example of FIG. 8, tap register 86 identifies that bits 1, 6 and 19 of the shift register are to be tapped, whilst majority mask register 84 identifies that bit 19 must be logically combined (exclusively-ORed (XORed)) prior to majority determination. Again, majority mask register 84 and tap register 86 are programmable to allow the tap positions to be re-defined at any time. Indeed, this re-programming may be implemented in real-time so that equipment can be adapted to provide alternative majority functions, if required.

Figure 9:
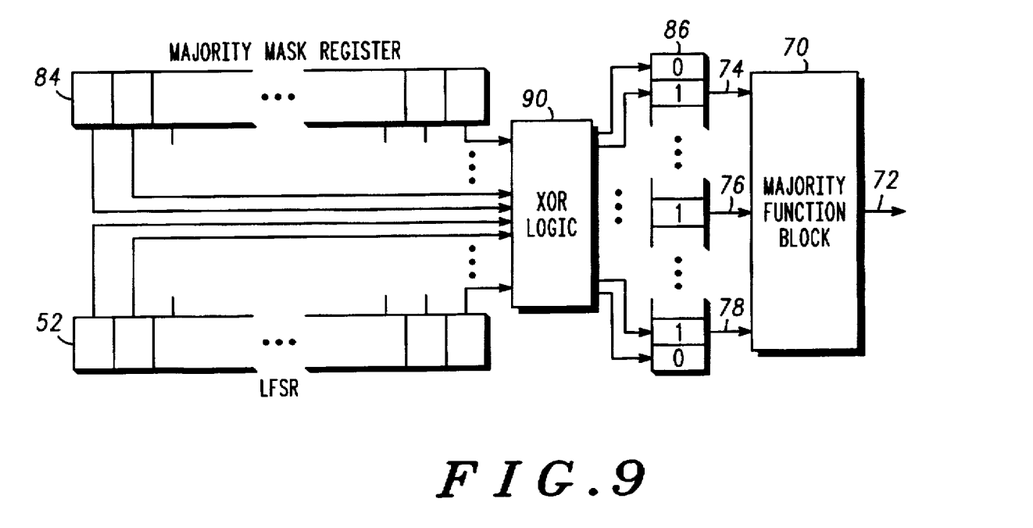
FIG. 9 illustrates a hardware configuration of a preferred embodiment for implementing a majority function.
Figure 10:
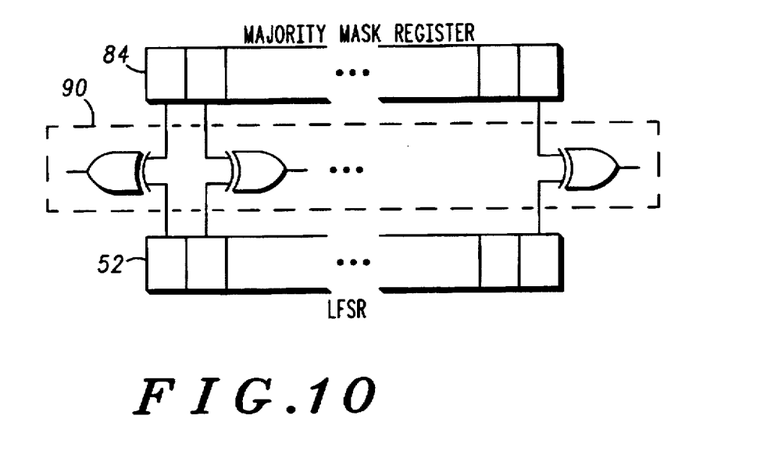
FIG. 10 illustrates a portion of the hardware configuration of the preferred embodiment of FIG. 9 for performing a logical operation.

FIGS. 9 and 10 illustrate a more detailed arrangement of the hardware configuration of the second aspect of the present invention. In a similar manner to that previously described for the LFSR of FIGS. 2 and 3, corresponding bits of a shift register and majority mask register 86 are logically combined in an XOR logic block 90. As will be appreciated, a data word stored in shift register 52 is non-destructively combined (XORed) with corresponding bits in the majority mask register 84. Resultant data bits from this logical combination are then masked by corresponding data bits in tap register 86. Tap register 86 is arranged to provide a switch-type function whereby only resultant data bits that are logically combined with a particular, predefined data value (in this case logical "1") are passed through the tap register to provide inputs 74, 76 and 78 to the majority function block 70. Therefore, tap register 86 terminates (or prevents) throughput of resultant data bits not identified in the tap register, and thereby restricts the number of inputs provided to majority function block 70. The majority function may now be performed on the inputs 74, 76 and 78 in a single step of a DSP or the like.

Implementation of the majority function according to the register arrangement of this aspect of the invention reduces processing load by ~90%, while reducing associated GSM cipher-algorithm overhead by approximately 25%.

Figure 11:
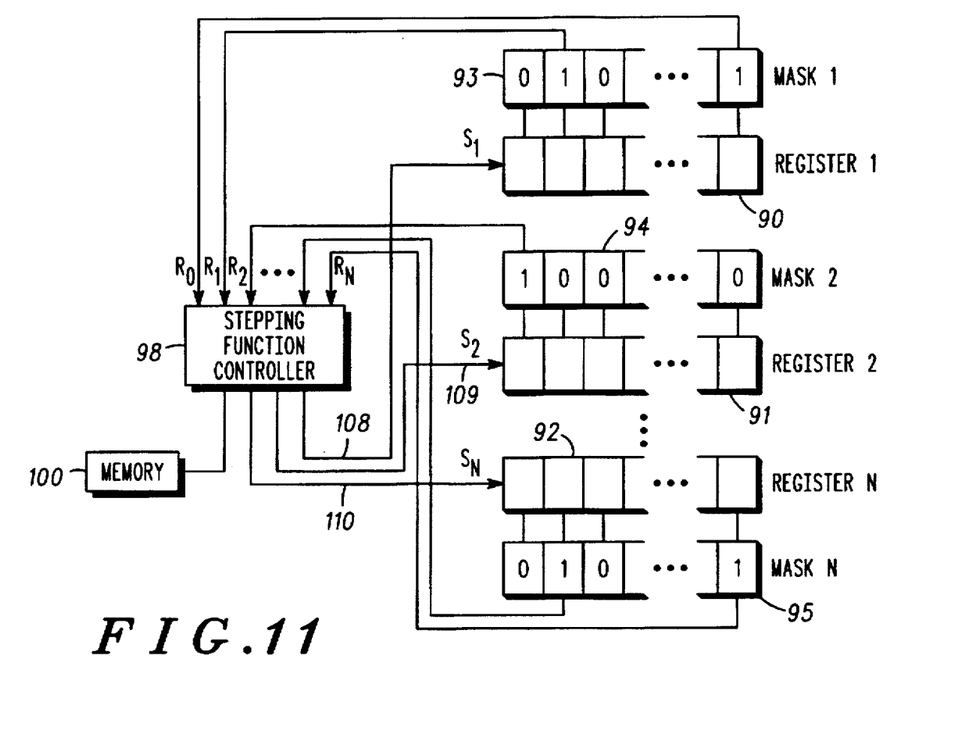
FIG. 11 illustrates a preferred hardware implementation of a register stepping function according to a further aspect of the present invention.
Figures 12, 13:
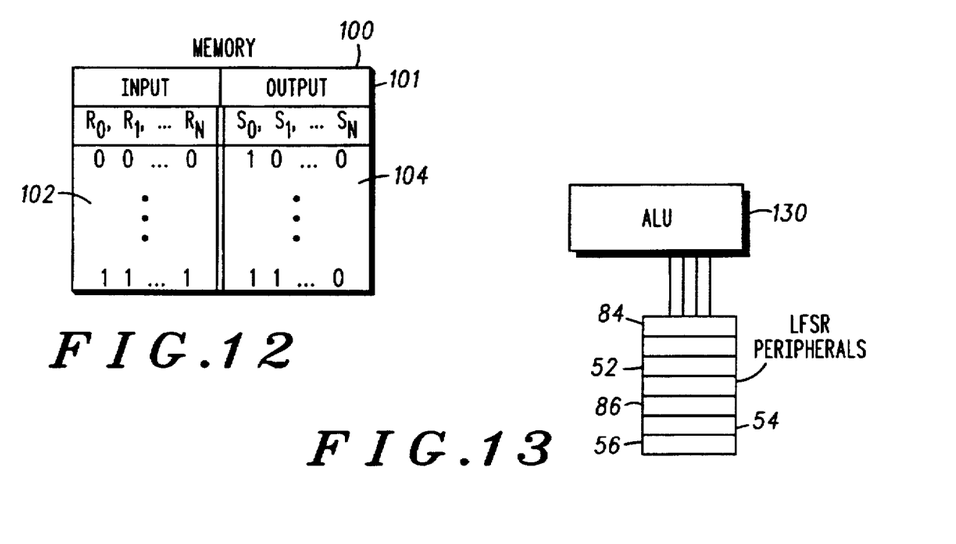
FIG. 12 illustrates a memory device containing a look-up table that may be used in FIG. 9.
FIG. 13 illustrates a block diagram of the general concepts of the present invention.

FIGS. 11 and 12 illustrate how a stepping function may be implemented according to a third aspect of the present invention. A number of shift registers 90, 91 and 92 (e.g. the LFSRs of the first two aspects of the present invention, namely LFSR 52 or LFSR 80) each have a dedicated mask register 93, 94 and 95 associated therewith. Each mask register contains a data word that identifies particular bits in the shift registers 90, 91 and 92 upon which the stepping function is based. Corresponding bits of each register and associated mask are logically combined to determine whether each particular data bit in each register is forwarded to a stepping function controller 98 (i.e. a processing unit). More particularly, each mask register is arranged to provide a switch-type function whereby only resultant data bits that are logically combined with a particular, predefined data value (in this case logical "1") are passed through the mask register to provide inputs $R_0, R_1, \ldots R_N$ to the stepping function controller 98. These inputs $R_0, R_1, \ldots R_N$ form an input data word. Therefore, each mask register (93–95) terminates (or prevents) throughput of resultant data bits not identified in the mask register, and thereby restricts the number of inputs $R_0, R_1, \ldots R_N$ provided to stepping function controller 98. Additionally, as will be appreciated, each shift register 90–92 may provide any number of inputs $R_0, R_1, \ldots R_N$ to the stepping function controller 98. Clearly, although FIG. 11 illustrates that register 90 provides inputs $R_0$ and $R_1$ to the two most significant bits of the stepping function controller 98, register 90 could be arranged to provide one input, five inputs or no inputs, for example. This applies equally to shift registers 91 and 92.

Since the positions of the taps in the mask registers 93–95 may be varied (i.e. the mask registers 93–95 may be re-programmed), the numerous shift registers 90–92 are arranged in a hierarchical order. Moreover, taps within a particular masks (associated with a particular register) are also treated in terms of a hierarchy. For example, shift register 90 may have a greater importance that shift register 91, while shift register 92 is the least important of all. Similarly, the most significant bit contained in shift register 90 may be designated as more important that the least significant bit of register 90, or vice versa. These hierarchical orders define the order in which inputs $R_0, R_1, \ldots R_N$ are provided to the stepping function controller 98.

A memory device 100, in which is stored a look-up table 101 of input data words 102 and resultant step function data words 104, is coupled to the stepping function controller 98. In response to a comparison performed by the stepping function controller 98, a step function data word 104, containing data bits $S_1, S_2, \ldots S_N$, is selected from the look-up table 101 based upon the input data word ($R_0, R_1, \ldots R_N$). Individual bits, i.e. $S_1, S_2 \ldots S_N$, of the step function data words 104 determine whether or not data stored in each shift registers 90-92 is stepped (shifted). More specifically, the stepping function is programmed via two arrays, each $2^N$ deep and N wide; one to represent the input function and the other to represent the effect on the shift registers 90-92. As will be appreciated, a logical "1" in the output data word may represent an instruction to shift the data contained in the shift register, whereas a logical "0" would leave the contents of the register unchanged.

Since the stepping function controller 98 is coupled, via a control line 108-110, to each shift register 90-92 to control the stepping of the shift registers 90-92, the application of individual bits of the step function data word 104 to appropriate control lines 108-110 causes, where identified, a step (shift) in the register to occur. Hence, the stepping function may be performed in a single step of a DSP or the like.

Although the stepping function has been described by illustrating three shift registers (such as LFSRs), it will be appreciated that the concept can be expanded to include any number of shift registers. Furthermore, it will be appreciated that in the case where a shift register does not provide an input bit to the stepping function controller, that shift register may still be responsive to a data bit (e.g. $S_3$) of the step function data word 104.

The various mask registers of the third aspect of the present invention are again programmable to allow the tap positions to be re-defined at any time. Indeed, this re-programming may be implemented in real-time so that equipment can be adapted to provide alternative stepping functions, if required.

By implementing this aspect of the invention, processing load previously associated with implementing this stepping function in a DSP is reduced by 90%, while overhead associated with the GSM cipher-algorithm is reduced by approximately 25%.

In general, the number of processing steps required in a DSP to implement a particular function has been reduced by providing dedicated peripheral registers that identify tap positions (from a shift register, such as a linear feedback shift register) required in feedback paths. Subsequently, the logical combination of corresponding bits of the registers produces a result that can be input directly into a processing unit to produce a desired function in one processing step. This is illustrated in FIG. 13, in which an arithmetic logic unit (ALU) 130 is coupled to a block of LFSR peripherals containing mask and tap registers (such as those described in relation to the various aspects of the present invention), with the ALU arranged to perform a one-step operation to actuate the desired function.

According to the present invention, tasks that require extensive processor activity (i.e. tasks that require multi-step instructions) have been replaced, where possible, by a hardware solution in which the number of processor steps required to execute a particular task has been reduced to a minimum. Consequently, the processor (such as a DSP) has a perceptual increase in processing power (capacity). Since previous multi-step tasks are now performed in a single instruction, there is a reduction in the time necessary to perform the task and therefore an increase in the number of such tasks that can be performed in unit time. As such, the throughput provided by each DSP is increased, thus allowing fewer DSPs to handle more voice communications in a base station of a communication system, for example.

Not only does the present invention provide the flexibility that allows adaptation of infrastructure equipment in which the present invention is installed, but there is a relative saving in cost over the prior art solution of developing dedicated, integrated circuits. The present invention is particularly useful in relation to encryption used in the GSM pan-European communication system where the encryption (and decryption) algorithms are processor intensive tasks.

As will be appreciated, the shift registers of each aspect of the present invention are typically cleared prior to the first execution of each functional operation. Furthermore, and as will be appreciated, the dedicated registers, e.g. the numerous tap and mask registers, may be programmed independently of firmware in a piece of equipment. As such, these dedicated registers can be re-programmed to adapt the system for different tap requirements imposed by different types of algorithm (and hence accommodate up-grades or changes in system functionality). Indeed, this re-programming may be implemented in real-time so that equipment can be adapted to receive a particular identified format of algorithm. Accordingly, the numerous aspects of the present invention provide a processing methodology and structure that is efficient (in as much as it requires only one step to be implemented in a DSP, for example) and flexible.

As will be appreciated, the concepts of the present invention are applicable to any equipment that utilises DSPs for encryption or the like, such equipment including subscriber handsets, O&Ms (Operation and Maintenance) infrastructure and Base Stations.

We claim:

1. A first feedback and shift unit comprising:
   first linear feedback shift register means for storing a value of the first feedback and shift unit;
   first tap register means for storing a first tap position indicator indicative of tap positions for the first feedback and shift unit;
   a first input for providing data to the first feedback and shift unit;
   first feedback matrix means, coupled to receive the data from the first input, for providing data bits, generated in response to the data and the first tap position indicator, that are shifted into the first linear feedback shift register means to form the value stored therein; and
   length register means for storing a length indicator, the length register means being logically coupled to the first linear feedback shift register means whereby the length indicator sets a length of the first linear feedback shift register means corresponding to a length of the first feedback and shift unit.

2. The first feedback and shift unit of claim 1, wherein the first feedback matrix means comprises a plurality of logic units.

3. The first feedback and shift unit of claim 2, wherein said plurality of logic units are exclusive-OR units.

4. The first feedback and shift unit of claim 1, further comprising:
   a second linear feedback shift register means for storing a value of a second feedback and shift unit;
   a second tap register means for storing a second tap position indicator indicative of tap positions for the second feedback and shift unit;
   a second input for providing data to the second feedback and shift unit;
   a second feedback matrix means, coupled to receive the data from the second input, for providing data bits, generated in response to the data and the second tap position indicator, that are shifted into the second linear feedback shift register means to form the value stored therein;

a first mask register, logically coupled to the first feedback and shift unit, for identifying and selectively passing only certain bits of the first linear feedback shift register means to provide a first output;

a second mask register, logically coupled to the second feedback and shift unit, for identifying and selectively passing only certain bits of the second linear feedback shift register means to provide a second output; and control means coupled to receive the first output and the second output and arranged to selectively step the first and second linear feedback shift register means in response thereto.

5. The feedback and shift device of claim 4, wherein said control means further comprises a look-up table of information against which information the first output and the second output are logically compared to determine which of the linear feedback register means of said first and said second feedback and shift units are shifted.

6. The feedback and shift device of claim 4, wherein the first linear feedback shift register and the second linear feedback shift register have a relative hierarchy, whereby the first out and the second output are received by the control means in a predetermined order.

7. The feedback and shift device of claim 4, wherein at least one of the first and second outputs contains a plurality of data bits having a relative hierarchy therebetween, whereby the plurality of data bits are received by the control means in a predetermined order.

8. A feedback and shift device for providing a majority function, said feedback and shift device comprising:

linear feedback shift resister means for storing a value of the feedback and shift device;

tap resister means for storing a tap position indicator indicative of tap positions for the feedback and shift device;

an input for providing data to the feedback and shift device;

feedback matrix means, coupled to receive the data from the input, for providing data bits, generated in response to the data and the first tap position indicator, that are shifted into the linear feedback shift register means to form the value stored therein;

a mask register for identifying and selecting particular bits of the linear feedback shift register means that are subject to a logical operation;

a logic network coupled to receive the bits selected by the mask register and arranged to perform the logical operation thereon to provide a first output data word having a plurality of data bits;

a second tap register arranged to identify and selectively pass only certain bits of the plurality of data bits of the first output data word; and majority determining means for determining a logical majority in response to the certain buts passed by the second tap register.

9. The feedback and shift device of claim 8, wherein the logic network comprises an exclusive-OR gate for combining bits selected by the mask register with a logical 1.

* * * * *